(12) United States Patent
Tang

(10) Patent No.: US 8,714,249 B1
(45) Date of Patent: May 6, 2014

(54) WELLBORE SERVICING MATERIALS AND METHODS OF MAKING AND USING SAME

(71) Applicant: Halliburton Energy Serivices, Inc., Houston, TX (US)

(72) Inventor: Tingji Tang, Spring, TX (US)

(73) Assignee: Halliburton Energy Services, Inc., Duncan, OK (US)

( * ) Notice: Subject to any disclaimer, the term of this patent is extended or adjusted under 35 U.S.C. 154(b) by 0 days.

(21) Appl. No.: 13/662,055

(22) Filed: Oct. 26, 2012

(51) Int. Cl.
*E21B 43/25* (2006.01)
*E21B 43/26* (2006.01)

(52) U.S. Cl.
USPC ......... 166/281; 166/283; 166/300; 166/308.1

(58) Field of Classification Search
None
See application file for complete search history.

(56) References Cited

U.S. PATENT DOCUMENTS

| | | |
|---|---|---|
| 2,703,316 A | 3/1955 | Schneider |
| 3,912,692 A | 10/1975 | Casey et al. |
| 4,387,769 A | 6/1983 | Erbstoesser et al. |
| 4,585,064 A | 4/1986 | Graham et al. |
| 4,670,501 A | 6/1987 | Dymond et al. |
| 5,006,566 A | 4/1991 | Weber et al. |
| 5,216,050 A | 6/1993 | Sinclair |
| 5,249,627 A | 10/1993 | Harms et al. |
| 5,373,901 A | 12/1994 | Norman et al. |
| 5,833,000 A | 11/1998 | Weaver et al. |
| 5,839,510 A | 11/1998 | Weaver et al. |
| 5,853,048 A | 12/1998 | Weaver et al. |
| 5,905,061 A | 5/1999 | Patel |
| 5,960,880 A | 10/1999 | Nguyen et al. |
| 5,977,031 A | 11/1999 | Patel |
| 6,209,646 B1 * | 4/2001 | Reddy et al. ................ 166/300 |
| 6,257,335 B1 | 7/2001 | Nguyen et al. |
| 6,287,639 B1 | 9/2001 | Schmidt et al. |
| 6,311,773 B1 | 11/2001 | Todd et al. |
| 6,323,307 B1 | 11/2001 | Bigg et al. |
| 6,387,968 B1 | 5/2002 | Glück et al. |
| 6,439,309 B1 | 8/2002 | Matherly et al. |
| 6,527,051 B1 | 3/2003 | Reddy et al. |
| 6,554,071 B1 | 4/2003 | Reddy et al. |
| 6,582,819 B2 | 6/2003 | McDaniel et al. |

(Continued)

FOREIGN PATENT DOCUMENTS

WO    2008038033 A1    4/2008

OTHER PUBLICATIONS

Albertsson, Ann-Christine, et al., "Aliphatic Polyesters: Synthesis, Properties and Applications," Advances in Polymer Science, 2002, pp. 1-65, 67-161, and 2 Preface pages, vol. 157, Springer-Verlag Berlin Heidelberg.

(Continued)

*Primary Examiner* — George Suchfield
(74) *Attorney, Agent, or Firm* — Craig Roddy; Conley Rose, P.C.

(57) ABSTRACT

A method of servicing a wellbore in a subterranean formation comprising placing a first wellbore servicing fluid comprising a self-degrading diverter material into the wellbore wherein the self-degrading diverter materials comprises (i) a diverting material and (ii) a degradation accelerator; allowing the self-degrading diverter material to form a diverter plug at a first location in the wellbore or subterranean formation; diverting the flow of a second wellbore servicing fluid to a second location in the wellbore or subterranean formation; and removing the diverter plug, wherein the first and second wellbore servicing fluids may be the same or different.

21 Claims, 1 Drawing Sheet

(56) References Cited

U.S. PATENT DOCUMENTS

| | | | |
|---|---|---|---|
| 6,677,426 B2 | 1/2004 | Noro et al. | |
| 6,782,735 B2 | 8/2004 | Walters et al. | |
| 6,828,279 B2 | 12/2004 | Patel et al. | |
| 6,877,563 B2 | 4/2005 | Todd et al. | |
| 7,021,383 B2 | 4/2006 | Todd et al. | |
| 7,036,587 B2 | 5/2006 | Munoz, Jr. et al. | |
| 7,044,220 B2 * | 5/2006 | Nguyen et al. | 166/280.2 |
| 7,131,491 B2 | 11/2006 | Blauch et al. | |
| 7,153,575 B2 | 12/2006 | Anderson et al. | |
| 7,166,560 B2 | 1/2007 | Still et al. | |
| 7,281,581 B2 | 10/2007 | Nguyen et al. | |
| 7,334,636 B2 | 2/2008 | Nguyen | |
| 7,350,579 B2 | 4/2008 | Gatlin et al. | |
| 7,380,600 B2 | 6/2008 | Willberg et al. | |
| 7,392,847 B2 | 7/2008 | Gatlin et al. | |
| 7,431,088 B2 | 10/2008 | Moorehead et al. | |
| 7,455,112 B2 | 11/2008 | Moorehead et al. | |
| 7,475,728 B2 | 1/2009 | Pauls et al. | |
| 7,534,745 B2 | 5/2009 | Taylor et al. | |
| 7,541,318 B2 | 6/2009 | Weaver et al. | |
| 7,565,929 B2 * | 7/2009 | Bustos et al. | 166/279 |
| 7,581,590 B2 | 9/2009 | Lesko et al. | |
| 7,645,723 B2 | 1/2010 | Kirsner et al. | |
| 7,673,686 B2 | 3/2010 | Nguyen et al. | |
| 7,691,789 B2 | 4/2010 | Fu et al. | |
| 7,696,131 B2 | 4/2010 | Oyler et al. | |
| 7,775,278 B2 | 8/2010 | Willberg et al. | |
| 7,779,915 B2 | 8/2010 | Hutchins et al. | |
| 7,784,541 B2 * | 8/2010 | Hartman et al. | 166/280.1 |
| 7,786,051 B2 | 8/2010 | Lange et al. | |
| 7,819,192 B2 | 10/2010 | Weaver et al. | |
| 7,825,074 B2 | 11/2010 | Schmidt et al. | |
| 7,841,411 B2 | 11/2010 | Fuller et al. | |
| 7,858,561 B2 | 12/2010 | Abad et al. | |
| 7,896,068 B2 | 3/2011 | Lee | |
| 7,934,556 B2 | 5/2011 | Clark et al. | |
| 7,947,630 B2 | 5/2011 | Atkins et al. | |
| 7,956,017 B2 | 6/2011 | Gatlin et al. | |
| 8,003,579 B2 | 8/2011 | Akarsu et al. | |
| 8,016,034 B2 | 9/2011 | Glasbergen et al. | |
| 8,066,068 B2 | 11/2011 | Lesko et al. | |
| 8,076,271 B2 | 12/2011 | Blauch et al. | |
| 8,109,335 B2 | 2/2012 | Luo et al. | |
| 8,136,595 B2 | 3/2012 | Weaver et al. | |
| 8,163,826 B2 | 4/2012 | Willberg et al. | |
| 8,167,043 B2 | 5/2012 | Willberg et al. | |
| 8,230,925 B2 | 7/2012 | Willberg et al. | |
| 8,261,833 B2 | 9/2012 | Nguyen et al. | |
| 8,443,885 B2 | 5/2013 | Rickman et al. | |
| 2007/0173416 A1 | 7/2007 | Moorehead et al. | |
| 2008/0006405 A1 | 1/2008 | Rickman et al. | |
| 2008/0210423 A1 | 9/2008 | Boney | |
| 2009/0105097 A1 | 4/2009 | Abad et al. | |
| 2009/0246501 A1 | 10/2009 | Shuler et al. | |
| 2010/0044041 A1 | 2/2010 | Smith et al. | |
| 2010/0160187 A1 | 6/2010 | Nguyen et al. | |
| 2010/0273685 A1 | 10/2010 | Saini et al. | |
| 2010/0323932 A1 | 12/2010 | Bustos et al. | |
| 2011/0030958 A1 | 2/2011 | Fedorov et al. | |
| 2011/0039737 A1 | 2/2011 | Schmidt et al. | |
| 2011/0120712 A1 | 5/2011 | Todd et al. | |
| 2011/0226479 A1 | 9/2011 | Tippel et al. | |
| 2011/0227254 A1 | 9/2011 | Reck-Glenn et al. | |
| 2011/0284222 A1 | 11/2011 | Chaabouni et al. | |
| 2012/0024526 A1 | 2/2012 | Liang et al. | |
| 2012/0225967 A1 | 9/2012 | Amano et al. | |

OTHER PUBLICATIONS

Filing receipt and specification for patent application entitled "Methods of Using Nanoparticle Suspension Aids in Subterranean Operations," by Philip D. Nguyen, et al., filed Jun. 21, 2012 as U.S. Appl. No. 13/529,413.

Filing receipt and specification for patent application entitled "Wellbore Servicing Methods and Compositions Comprising Degradable Polymers," by B. Raghava Reddy, et al., filed Oct. 25, 2012 as U.S. Appl. No. 13/660,740.

Filing receipt and specification for patent application entitled "Wellbore Servicing Fluids Comprising Foamed Materials and Methods of Making and Using Same," by Tingji Tang, et al., filed Oct. 26, 2012 as U.S. Appl. No. 13/662,000.

Filing receipt and specification for patent application entitled "Expanded Wellbore Servicing Materials and Methods of Making and Using Same," by Tingji Tang, filed Oct. 26, 2012 as U.S. Appl. No. 13/661,940.

Filing receipt and specification for patent application entitled "Expanded Wellbore Servicing Materials and Methods of Making and Using Same," by Tingji Tang, filed Oct. 26, 2012 as U.S. Appl. No. 13/662,105.

Halliburton brochure entitled "SandTrap® ABC Formation Consolidation Service," Sand Control Fluids and Pumping, Jun. 2011, 2 pages, Halliburton.

Filing receipt and specification for patent application entitled "Wellbore Servicing Methods and Compositions Comprising Degradable Polymers," by B. Raghava Reddy, et al., filed Oct. 29, 2013 as U.S. Appl. No. 14/065,701.

Foreign communication from a related counterpart application—International Search Report and Written Opinion, PCT/US2013/061429, Dec. 20, 2013, 12 pages.

Foreign communication from a related counterpart application—International Search Report and Written Opinion, PCT/US2013/061434, Jan. 9, 2014, 12 pages.

Foreign communication from a related counterpart application—International Search Report and Written Opinion, PCT/US2013/061425, Jan. 8, 2014, 11 pages.

Foreign communication from a related counterpart application—International Search Report and Written Opinion, PCT/US2013/061437, Jan. 20, 2014, 10 pages.

* cited by examiner

Diverting materials

WELLBORE SERVICING MATERIALS AND METHODS OF MAKING AND USING SAME

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND

1. Field

This disclosure relates to methods of servicing a wellbore. More specifically, it relates to wellbore servicing fluids comprising degradable materials and methods of making and using same.

2. Background

Natural resources (e.g., oil or gas) residing in the subterranean formation may be recovered by driving resources from the formation into the wellbore using, for example, a pressure gradient that exists between the formation and the wellbore, the force of gravity, displacement of the resources from the formation using a pump or the force of another fluid injected into the well or an adjacent well. The production of fluid in the formation may be increased by hydraulically fracturing the formation. That is, a viscous fracturing fluid may be pumped down the wellbore at a rate and a pressure sufficient to form fractures that extend into the formation, providing additional pathways through which the oil or gas can flow to the well.

Unfortunately, water rather than oil or gas may eventually be produced by the formation through the fractures therein. To provide for the production of more oil or gas, a fracturing fluid may again be pumped into the formation to form additional fractures therein. However, the previously used fractures first must be plugged to prevent the loss of the fracturing fluid into the formation via those fractures.

Traditional fracturing operations, also termed plug and perforate operations, to increase the productivity of the subterranean formation employ a perforation of the subterranean formation followed by setting of a fracturing plug with typical operation times ranging from 3-5 hours. Additionally to achieve a user and/or process desired goal, the fracturing may need to be repeated numerous times resulting in lengthy equipment stand by times. Once the process is complete the fracturing plugs are typically removed, for example by drilling out. Alternative methods employ processes such as the ACESSFRAC PD service which utilizes perforation in conjunction with degradable diverting materials (e.g., BIOVERT NWB) and the resultant process provides numerous benefits in terms of reduced operation time, reduced equipment standby time, increased safety, reduced risk of premature setting of the fracturing plug, avoiding the need to drill out the plug before production and reducing the time for fluid flow back when compared to fracture plugs which set into place. While processes such as ACCESSFRAC PD provide advantages over the use of fracture plugs, one challenge in these operations is that the degradable diverting materials utilized also need to be removed prior to production. An ongoing need exists for improved compositions and methods for fracturing operations.

SUMMARY

Disclosed herein is a method of servicing a wellbore in a subterranean formation comprising placing a first wellbore servicing fluid comprising a self-degrading diverter material into the wellbore wherein the self-degrading diverter materials comprises (i) a diverting material and (ii) a degradation accelerator; allowing the self-degrading diverter material to form a diverter plug at a first location in the wellbore or subterranean formation; diverting the flow of a second wellbore servicing fluid to a second location in the wellbore or subterranean formation; and removing the diverter plug, wherein the first and second wellbore servicing fluids may be the same or different.

Also disclosed herein is a wellbore servicing fluid comprising self-degrading diverter material wherein the self-degrading diverter material comprises polylactide, sodium carbonate and a carrier fluid.

Further disclosed herein is a method of servicing a wellbore in a subterranean formation comprising placing a wellbore servicing fluid into the subterranean formation at a first location; plugging the first location with a self-degrading diverter material comprising a diverting material and a degradation accelerator such that all or a portion of the wellbore servicing fluid is diverted to a second location in the subterranean formation; placing the wellbore servicing fluid into the subterranean formation at the second location; and allowing the self-degrading diverter material to degrade to provide a flowpath from the subterranean formation to the wellbore for recovery of resources from the subterranean formation.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

DETAILED DESCRIPTION

Figure 1A:
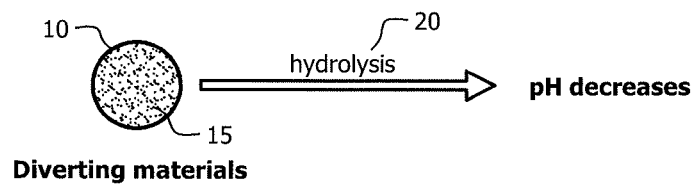
FIGS. 1A and 1B are schematics of embodiments for use of the self-degrading diverter materials disclosed herein.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques below, including the exemplary designs and implementations illustrated and described herein, but may be modified within the scope of the appended claims along with their full scope of equivalents.

Disclosed herein are wellbore servicing fluids or compositions comprising a diverting material and a degradation accelerator. Compositions comprising a diverting material (DM) and a degradation accelerator (DA) are herein termed self-degrading diverter materials and designated (SDDM).

Utilization of a SDDM in the methods disclosed herein may advantageously facilitate removal of a diverter material from a fluid flow path subsequent to the diverter material performing its intended function.

In an embodiment, the DM comprises any material suitable for distribution within or into a flowpath (e.g., a subterranean flowpath within a wellbore and/or surrounding formation), for example, so as to form a pack, a bridge, a plug or a filter cake and thereby obstruct fluid movement via that flowpath. In an embodiment, the DM is configured to reduce the fluid flow via a given flowpath (i.e., reduce the fluid permeability of a point of entry for fluids into the formation) such that fluid movement is diverted (e.g., redirected) to another flowpath within the wellbore and/or surrounding formation, for example during a fracturing operation.

In an embodiment, the DM is comprised of a naturally-occurring material. Alternatively, the DM comprises a synthetic material. Alternatively, the DM comprises a mixture of a naturally-occurring and synthetic material.

In an embodiment, the DM comprises a degradable material that may undergo irreversible degradation downhole. As used herein "degradation" refers to the separation of the material into simpler compounds that do not retain all the characteristics of the starting material. The terms "degradation" or "degradable" may refer to either or both of heterogeneous degradation (or bulk erosion) and/or homogeneous degradation (or surface erosion), and/or to any stage of degradation in between these two. Not intending to be bound by theory, degradation may be a result of, inter alia, an external stimuli (e.g., heat, temperature, pH, etc.). As used herein, the term "irreversible" means that the degradable material, once degraded downhole, should not recrystallize or reconsolidate while downhole.

In an embodiment, the DM comprises a degradable polymer. Herein the disclosure may refer to a polymer and/or a polymeric material. It is to be understood that the terms polymer and/or polymeric material herein are used interchangeably and are meant to each refer to compositions comprising at least one polymerized monomer in the presence or absence of other additives traditionally included in such materials. Examples of degradable polymers suitable for use as the DM include, but are not limited to homopolymers, random, block, graft, star- and hyper-branched aliphatic polyesters, copolymers thereof, derivatives thereof, or combinations thereof. The term "derivative" is defined herein to include any compound that is made from one or more of the diverting materials, for example, by replacing one atom in the diverting material with another atom or group of atoms, rearranging two or more atoms in the diverting material, ionizing one of the diverting materials, or creating a salt of one of the diverting materials. The term "copolymer" as used herein is not limited to the combination of two polymers, but includes any combination of any number of polymers, e.g., graft polymers, terpolymers and the like.

In an embodiment, the degradable polymer comprises polysaccharides; lignosulfonates; chitins; chitosans; proteins; proteinous materials; fatty alcohols; fatty esters; fatty acid salts; aliphatic polyesters; poly(lactides); poly(glycolides); poly(ε-caprolactones); polyoxymethylene; polyurethanes; poly(hydroxybutyrates); poly(anhydrides); aliphatic polycarbonates; polyvinyl polymers; acrylic-based polymers; poly(amino acids); poly(aspartic acid); poly(alkylene oxides); poly(ethylene oxides); polyphosphazenes; poly(orthoesters); poly(hydroxy ester ethers); polyether esters; polyester amides; polyamides; polyhydroxyalkanoates; polyethyleneterephthalates; polybutyleneterephthalates; polyethylenenaphthalates, and copolymers, blends, derivatives, or combinations thereof. In an embodiment, the DM comprises BIOFOAM. BIOFOAM is a biodegradable plant-based foam commercially available from Synbra.

In an embodiment, the degradable polymer comprises substituted or unsubstituted lactides, glycolides, polylactic acid (PLA), polyglycolic acid (PGA), copolymers of PLA and PGA, copolymers of glycolic acid with other hydroxy-, carboxylic acid-, or hydroxycarboxylic acid-containing moieties, copolymers of lactic acid with other hydroxy-, carboxylic acid-, or hydroxycarboxylic acid-containing moieties, or combinations thereof.

In an embodiment, the degradable polymer comprises an aliphatic polyester which may be represented by the general formula of repeating units shown in Formula I:

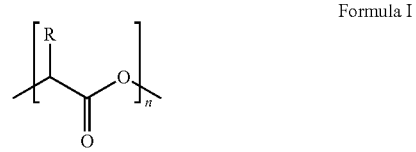

Formula I where n is an integer ranging from about 75 to about 10,000, alternatively from about 100 to about 500, or alternatively from about 200 to about 2000 and R comprises hydrogen, an alkyl group, an aryl group, alkylaryl groups, acetyl groups, heteroatoms, or combinations thereof.

In an embodiment, the aliphatic polyester comprises poly(lactic acid) or polylactide (PLA). Because both lactic acid and lactide can achieve the same repeating unit, the general term poly(lactic acid), as used herein, refers to Formula I without any limitation as to how the polymer was formed (e.g., from lactides, lactic acid, or oligomers) and without reference to the degree of polymerization or level of plasticization.

Also, as will be understood by one of ordinary skill in the art, the lactide monomer may exist, generally, in one of three different forms: two stereoisomers L- and D-lactide and racemic D,L-lactide (meso-lactide). The oligomers of lactic acid, and oligomers of lactide suitable for use in the present disclosure may be represented by general Formula II:

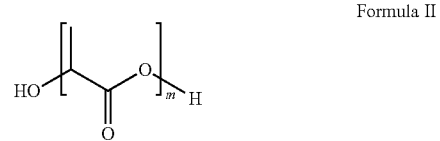

Formula II where m is an integer 2≤m≤75, alternatively, m is an integer and 2≤m≤10. In such an embodiment, the molecular weight of the PLA may be less than about 5,400 g/mole, alternatively, less than about 720 g/mole, respectively. The stereoisomers of lactic acid may be used individually or combined to be used in accordance with the present disclosure.

In an additional embodiment, the degradable polymer comprises a copolymer of lactic acid. A copolymer of lactic acid may be formed by copolymerizing one or more stereoisomers of lactic acid with, for example, glycolide, ε-caprolactone, 1,5-dioxepan-2-one, or trimethylene carbonate, so as to obtain polymers with different physical and/or mechanical properties that are also suitable for use in the present disclosure. In an embodiment, degradable polymers suitable for use in the present disclosure are formed by blending, copolymerizing or otherwise mixing the stereoisomers of lactic acid. Alternatively, degradable polymers suitable for use in the present disclosure are formed by blending, copolymerizing or otherwise mixing high and/or low molecular weight polylactides. Alternatively, degradable polymers suitable for use in the present disclosure are formed by blending, copolymerizing or otherwise mixing polylactide with other polyesters. In an embodiment, the degradable polymer comprises PLA which may be synthesized using any suitable methodology. For example, PLA may be synthesized either from lactic acid by a condensation reaction or by a ring-opening polymerization of a cyclic lactide monomer. Methodologies for the preparation of PLA are described in U.S. Pat. Nos. 6,323,307; 5,216,050; 4,387,769; 3,912,692; and 2,703,316, each of which is incorporated by reference herein in its entirety. Additional descriptions of degradable polymers suitable for use in the present disclosure may be found in the publication of Advances in Polymer Science, Vol. 157 entitled "Aliphatic Polyesters: *Synthesis, Properties and Applications,*" 2002, pp. 1-65, 67-161 edited by A. C. Albertsson, which is incorporated herein in its entirety.

In an embodiment, the degradable polymer comprises a polyanhydride. Examples of polyanhydrides suitable for use in the present disclosure include, but are not limited to, poly(adipic anhydride), poly(suberic anhydride), poly(sebacic anhydride), poly(dodecanedioic anhydride), poly(maleic anhydride), poly(benzoic anhydride), or combinations thereof.

In an embodiment, the degradable polymer comprises polysaccharides, such as starches, cellulose, dextran, substituted or unsubstituted galactomannans, guar gums, high-molecular weight polysaccharides composed of mannose and galactose sugars, heteropolysaccharides obtained by the fermentation of starch-derived sugar (e.g., xanthan gum), diutan, scleroglucan, derivatives thereof, or combinations thereof.

In an embodiment, the degradable polymer comprises guar or a guar derivative. Nonlimiting examples of guar derivatives suitable for use in the present disclosure include hydroxypropyl guar, carboxymethylhydroxypropyl guar, carboxymethyl guar, hydrophobically modified guars, guar-containing compounds, synthetic polymers, or combinations thereof.

In an embodiment, the degradable polymer comprises cellulose or a cellulose derivative. Nonlimiting examples of cellulose derivatives suitable for use in the present disclosure include cellulose ethers, carboxycelluloses, carboxyalkylhydroxyethyl celluloses, hydroxyethylcellulose, hydroxypropylcellulose, carboxymethylhydroxyethylcellulose, carboxymethylcellulose, or combinations thereof.

In an embodiment, the degradable polymer comprises a starch. Nonlimiting examples of starches suitable for use in the present disclosure include native starches, reclaimed starches, waxy starches, modified starches, pre-gelatinized starches, or combinations thereof.

In an embodiment, the degradable polymer comprises acrylic-based polymers, such as acrylic acid polymers, acrylamide polymers, acrylic acid-acrylamide copolymers, acrylic acid-methacrylamide copolymers, polyacrylamides, polymethacrylamides, partially hydrolyzed polyacrylamides, partially hydrolyzed polymethacrylamides, ammonium and alkali metal salts thereof, or combinations thereof.

In an embodiment, the degradable polymer comprises polyamides, such as polycaprolactam derivatives, poly-paraphenylene terephthalamide or combinations thereof. In an embodiment, the degradable polymer comprises nylon 6,6; nylon 6; KEVLAR, or combinations thereof.

The physical properties associated with the degradable polymer may depend upon several factors including, but not limited to, the composition of the repeating units, flexibility of the polymer chain, the presence or absence of polar groups, polymer molecular mass, the degree of branching, polymer crystallinity, polymer orientation, or the like. For example, a polymer having substantial short chain branching may exhibit reduced crystallinity while a polymer having substantial long chain branching may exhibit for example, a lower melt viscosity and impart, inter alia, elongational viscosity with tension-stiffening behavior. The properties of the degradable polymer may be further tailored to meet some user and/or process designated goal using any suitable methodology such as blending and/or copolymerizing the degradable polymer with another polymer, or by changing the macromolecular architecture of the degradable polymer (e.g., hyperbranched polymers, star-shaped, or dendrimers, etc.).

In an embodiment, in choosing the appropriate degradable polymer, an operator may consider the degradation products that will result. For example, an operator may choose the degradable polymer such that the resulting degradation products do not adversely affect one or more other operations, treatment components, the formation, or combinations thereof. Additionally, the choice of degradable polymer may also depend, at least in part, upon the conditions of the well.

Nonlimiting examples of additional degradable polymers suitable for use in conjunction with the methods of this disclosure are described in more detail in U.S. Pat. Nos. 7,565,929 and 8,109,335, and U.S. Patent Publication Nos. 20100273685 A1, 20110005761 A1, 20110056684 A1 and 20110227254 A1, each of which is incorporated by reference herein in its entirety.

In an embodiment, the degradable polymer further comprises a plasticizer. The plasticizer may be present in an amount sufficient to provide one or more desired characteristics, for example, (a) more effective compatibilization of the melt blend components, (b) improved processing characteristics during the blending and processing steps, (c) control and/or regulation of the sensitivity and degradation of the polymer by moisture, (d) control and/or adjust one or more properties of the foam (e.g., strength, stiffness, etc.), or combinations thereof. Plasticizers suitable for use in the present disclosure include, but are not limited to, derivatives of oligomeric lactic acid, such as those represented by the formula:

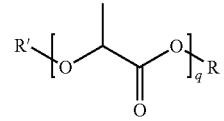

Formula III where R and/or R' are each a hydrogen, an alkyl group, an aryl group, an alkylaryl group, an acetyl group, a heteroatom, or combinations thereof provided that R and R' cannot both be hydrogen and that both R and R' are saturated; q is an integer where the value of q ranges from greater than or equal to 2 to less than or equal to 75 or alternatively from greater than or equal to 2 to less than or equal to 10. As used herein the term "derivatives of oligomeric lactic acid" may include derivatives of oligomeric lactide. In an embodiment where a plasticizer of the type disclosed herein is used, the plasticizer may be intimately incorporated within the degradable polymeric materials.

In an embodiment, the DM comprises one or more components of BIOVERT NWB diverting agent, BIOVERT CF diverting agents, BIOVERT H150 diverter and fluid loss control material or combinations thereof. BIOVERT NWB diverting agent is a near-wellbore biodegradable diverting agent; BIOVERT H150 diverter and fluid loss control material and BIOVERT CF is a complex fracture biodegradable diverting agent; each of which is commercially available from Halliburton Energy Services.

In an embodiment, a DA may comprise a material suitable for placement in a wellbore formation concurrently with a DM that functions to enhance the rate of degradation of a DM. The DM may be degraded via hydrolytic or aminolytic degradation in the presence of a DA. In an embodiment, the DA comprises an inorganic base, an organic base, an acid, a pH-modifying material precursor (e.g., base precursor, acid precursor), or combinations thereof.

In an embodiment, the DA comprises a pH-modifying material precursor. Herein a pH-modifying material precursor (e.g., base precursor, acid precursor) is defined as a material or combination of materials that provides for delayed release of one or more acidic or basic species. Such pH-modifying material precursors may also be referred to as time-delayed and/or time-released acids or bases. In some embodiments, the pH-modifying material precursors comprise a material or combination of materials that may react to generate and/or liberate an acid or a base after a period of time has elapsed. The liberation of the acidic or basic species from the pH-modifying material precursor may be accomplished through any means known to one of ordinary skill in the art with the benefits of this disclosure and compatible with the user-desired applications.

In some embodiments, pH-modifying material precursors may be formed by modifying acids or bases via the addition of an operable functionality or substituent, physical encapsulation or packaging, or combinations thereof. The operable functionality or substituent may be acted upon in any fashion (e.g., chemically, physically, thermally, etc.) and under any conditions compatible with the components of the process in order to release the acid or the base at a some user and/or process desired time and/or under desired conditions such as in situ wellbore conditions. In an embodiment, the pH-modifying material precursor may comprise at least one modified acid or base (e.g., having an operable functionality, encapsulation, packaging, etc.) such that when acted upon and/or in response to pre-defined conditions (e.g., in situ wellbore conditions such as temperature, pressure, chemical environment), an acid or base is released. In an embodiment, the pH-modifying material precursor may comprise an acidic or basic species that is released after exposure to an elevated temperature such as an elevated wellbore temperature (e.g., greater than about 120° F.). In an embodiment, the pH-modifying material precursor comprises a material which reacts with one or more components of the wellbore servicing fluid (e.g., reacts with an aqueous fluid present in the WSF) to liberate at least one acidic or basic species.

A pH-modifying material precursor as used herein generally refers to a component, which itself does not act as an acid or base by significantly modifying the pH of a solution into which it is introduced, but which, upon degradation, will yield one or more components capable of acting as an acid or a base by modifying the pH of that solution. For example, in an embodiment a pH-modifying material precursor may yield one or more components capable of modifying the pH of a solution by about 0.1 pH units, alternatively about 0.2 pH units, alternatively about 0.5 pH units, alternatively about 1.0 pH units, alternatively about 1.5 pH units, alternatively about 2.0 pH units, alternatively about 2.5 pH units, alternatively about 3.0 pH units, alternatively about 4.0 pH units, alternatively about 5.0 pH units, alternatively about 6.0 pH units, or alternatively about 7.0 or more pH units and such modifications may be an increase or decrease in pH.

In an embodiment, the pH-modifying material precursor may be characterized as exhibiting a suitable delay time. As used herein, the term "delay time" refers to the period of time from when a pH-modifying material precursor, or a combination of pH-modifying material precursors, is introduced into an operational environment until the pH-modifying material precursor or combination of precursors begins to alter (e.g., begins to degrade) the DM, as will be disclosed herein. In an embodiment, the pH-modifying material precursor may exhibit an average delay time of at least about 1 hour, alternatively at least about 2 hours, alternatively at least about 4 hours, alternatively at least about 8 hours, alternatively at least about 12 hours, or alternatively at least about 24 hours.

In an embodiment, the pH-modifying material precursor may be characterized as operable, as disclosed herein, within a suitable temperature range. As will be appreciated by one of skill in the art viewing this disclosure, differing pH-modifying material precursors may exhibit varying temperature ranges of operability. As such, in an embodiment, a pH-modifying material precursor, or combination of pH-modifying material precursors, may be selected for inclusion in the SDDM such that the pH-modifying material precursor(s) exhibit a desired operable temperature range (e.g., an ambient downhole temperature for a given wellbore). In addition, as will also be appreciated by one of skill in the art viewing this disclose, the degradation of the pH-modifying material precursor may be influenced by the temperature of the operational environment. For example, generally the rate of degradation of a given pH-modifying material precursor will be higher at higher temperatures. As such, the rate of degradation of a given pH-modifying material precursor may be generally higher when exposed to the environment within the wellbore. In an embodiment, the pH-modifying material precursor suitable for use in the present disclosure may exhibit an operable temperature range of from about 80° F. to about 400° F., alternatively from about 100° F. to about 300° F., or alternatively from about 120° F. to about 250° F.

In an embodiment, the pH-modifying material precursor is an acid precursor. In an embodiment, the acid precursor comprises a reactive ester. Hereinafter, the disclosure will focus on the use of a reactive ester as the acid precursor with the understanding that other acid precursors may be used in various embodiments. The reactive ester may be converted to an acidic species by hydrolysis of the ester linkage, for example by contact with water present in the WSF and/or water present in situ in the wellbore. In an embodiment, the acid precursor may comprise a lactone or lactide, a lactate ester, an acetate ester, a polyester, or combinations thereof.

In an embodiment, the acid precursor comprises esters and/or polyesters of acids of the type described previously herein; esters and/or polyesters of polyols (e.g., glycerol, glycols) with acids of the type described previously herein; aliphatic polyesters; glucono-delta-lactone; glucoheptonic lactone; poly(ε-caprolactones); poly(hydroxybutyrates); poly(anhydrides); aliphatic polycarbonates; poly(amino acids); polyphosphazenes; poly(ortho esters); orthoesters (which may also be known as "poly ortho esters" or "ortho esters; or combinations thereof. Nonlimiting examples of acid precursors suitable for use in the present disclosure include monoethylene monoformate, monoethylene diformate, ethylene glycol monoformate, ethylene glycol diformate, diethylene glycol monoformate, diethylene glycol diformate, triethylene glycol diformate, glyceryl monoformate, glyceryl diformate, glyceryl triformate; formate esters of pentaerythritol, tri-n-propyl orthoformate, tri-n-butyl orthoformate, methyl lactate, ethyl lactate, propyl lactate, butyl lactate, trilactin, polylactic acid, poly(lactides), methyl acetate, ethyl acetate, propyl acetate, butyl acetate, monoacetin, diacetin, triacetin, glyceryl diacetate, glyceryl triacetate, tripropionin (a triester of propionic acid and glycerol), methyl glycolate, ethyl glycolate, propyl glycolate, butyl glycolate, poly(glycolides), or combinations thereof. Other examples of acid precursors suitable for use as DAs in this disclosure are described in more detail in U.S. Pat. Nos. 6,877,563; 7,021,383 and 7,455,112 and U.S. Patent Application Nos. 2007/0169938 A1 and 20070173416 A1, each of which is incorporated by reference herein.

In an embodiment, the DA comprises an acid. Nonlimiting examples of acids suitable for use in the present disclosure include formic acid; acetic acid; lactic acid; glycolic acid; oxalic acid; propionic acid; butyric acid; monochloroacetic acid; dichloroacetic acid; trichloroacetic acid; hydrochloric acid; nitric acid; sulphuric acid; sulphonic acid; sulphinic acid; phosphoric acid; phosphorous acid; phosphonic acid; phosphinic acid; sulphamic acid; p-toluenesulfonic acid; or combinations thereof.

In an embodiment, the DA comprises an inorganic base (e.g., bases, basic salts). Nonlimiting examples of inorganic bases suitable for use in this disclosure include sodium hydroxide, potassium hydroxide, magnesium hydroxide, ammonium hydroxide, calcium carbonate, sodium carbonate, sodium bicarbonate, magnesium oxide, or combinations thereof.

In an embodiment, the DA comprises an organic base. In an embodiment, the organic base comprises amines, ethylene diamine, alkanolamines, ethanolamine, thriethanolamine, secondary amines, tertiary amines, oligomers of aziridine, triethylene tetramine, tetraethylene pentamine, polyethyleneimine, or combinations thereof. Other examples of bases suitable for use as DAs in this disclosure are described in more detail in U.S. Patent Publication No. 2010/0273685 A1 and U.S. patent application Ser. No. 13/660,740 filed Oct. 25, 2012 and entitled "Wellbore Servicing Methods and Compositions Comprising Degradable Polymers," each of which is incorporated by reference herein in its entirety.

In an embodiment, the DM and the DA are each present in the SDDM in amounts effective to perform its intended function. Thus, the amount of DM may range from about 10 wt. % to about 99 wt. %, alternatively from about 20 wt. % to about 80 wt. %, or alternatively from about 40 wt. % to about 70 wt. %, based on the total mass of the SDDM, while the amount of DA may range from about 1 wt. % to about 80 wt. %, alternatively from about 10 wt. % to about 60 wt. %, or alternatively from about 20 wt. % to about 50 wt. %, based on the total mass of SDDM.

In an embodiment, a DM of the type disclosed herein is associated with a DA of the type disclosed herein using any suitable methodology to form an SDDM.

In an embodiment, the SDDM is prepared by contacting the DM with the DA, and thoroughly mixing the components for example by compounding, injection molding, extrusion molding, extrusion, melt extrusion, compression molding, or any suitable combination of these methods.

In an embodiment, the DM is plasticized or melted by heating in an extruder and is contacted and mixed thoroughly with a DA of the type disclosed herein at a temperature of about greater than the melt temperature of the DM, the DA, or both. Alternatively, the DM may be contacted with the DA prior to introduction of the mixture to the extruder (e.g., via bulk mixing), during the introduction of the DM to an extruder, or combinations thereof.

The SDDMs of this disclosure may be converted to SDDM particles by any suitable method (e.g., chipping, cutting, milling, grinding, etc.) The SDDM particles may be produced about concurrently with the assembling of the SDDMs (e.g., on a sequential, integrated process line) or may be produced subsequent to the assembling of the SDDMs (e.g., on a separate process line such as an end use compounding and/or thermoforming line). In an embodiment, the SDDM is assembled via extrusion as previously described herein and the molten SDDM is fed to a shaping process (e.g., mold, die, lay down bar, etc.) where the SDDM is shaped. The assembling of the SDDM (e.g., contacting/mixing of the DM and DA) may occur prior to, during, or subsequent to the shaping.

In an embodiment, the SDDMs are further processed by mechanically sizing, cutting, or chopping the SDDM into particles using any suitable methodologies for such processes. The SDDMs suitable for use in this disclosure comprise SDDM particles of any suitable geometry, including without limitation beads, hollow beads, spheres, ovals, fibers, rods, pellets, platelets, disks, plates, ribbons, and the like, or combinations thereof.

In an embodiment, the SDDM comprises particles having an average particle size ranging from about 0.1 micron to about 3000 microns, alternatively from about 5 microns to about 2000 microns, alternatively from about 1 micron to about 500 microns, or alternatively from about 10 microns to about 100 microns. The average particle size of the SDDM may be determined using any suitable methodology or instrumentation such as a Malvern particle size analyzer.

Figure 1B:
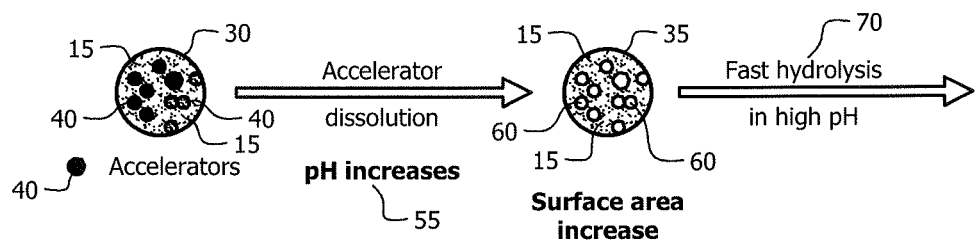

In an embodiment, the DM comprises BIOVERT NWB diverting agent and the DA comprises sodium bicarbonate. FIG. 1B displays a schematic of an SDDM particle 30. The SDDM 30 may be formed by contacting a DM 15 (e.g., a continuous phase) and a DA 40 (e.g., a discontinuous phase such as particles) both of the type disclosed herein, and compounding the components together into SDDM particles 30 having an average size of from about 50 microns to about 2000 microns.

In an embodiment, the DM comprises BIOVERT CF diverting agent and the DA comprises encapsulated sodium hydroxide. The SDDM in FIG. 1B may be formed by contacting the DM 15 and the DA 40, and subjecting the mixture to the process of injection molding. The SDDM may be further mechanically sized into SDDM particles 30 having an average size of from about 5 microns to about 200 microns by using any suitable methodology (e.g., cutting, chopping, and the like).

An SDDM of the type disclosed herein may be included in any suitable wellbore servicing fluid. As used herein, a "servicing fluid" refers to a fluid used to drill, complete, work over, fracture, repair, or in any way prepare a wellbore for the recovery of materials residing in a subterranean formation penetrated by the wellbore. Examples of wellbore servicing fluids include, but are not limited to, cement slurries, drilling fluids or muds, spacer fluids, lost circulation fluids, fracturing fluids, diverting fluids or completion fluids. The servicing fluid is for use in a wellbore that penetrates a subterranean formation. It is to be understood that "subterranean formation" encompasses both areas below exposed earth and areas below earth covered by water such as ocean or fresh water. In an embodiment, the SDDM may be present in a wellbore servicing fluid in an amount of from about 0.01 pounds per gallon (ppg) to about 6 ppg, alternatively from about 0.1 ppg to about 2 ppg, or alternatively from about 0.1 ppg to about 1 ppg.

In an embodiment, the DM and the DA are manufactured and then contacted together at the well site, forming the SDDM as previously described herein. Alternatively, the DM and the DA are manufactured and then contacted together either off-site or on-the-fly (e.g., in real time or on-location), forming the SDDM as previously described herein. In another embodiment, either the DM or the DA is preformed and the other one would be made on-the-fly, and the two materials would then be contacted together on-the-fly, forming the SDDM as previously described herein. When manufactured or assembled off site, the DM, DA and/or SDDM may be transported to the well site.

Alternatively, the SDDM may be assembled and prepared as a slurry in the form of a liquid additive. In an embodiment, the SDDM and a wellbore servicing fluid may be blended until the SDDM particulates are distributed throughout the fluid. By way of example, the SDDM particulates and a wellbore servicing fluid may be blended using a blender, a mixer, a stirrer, a jet mixing system, or other suitable device. In an embodiment, a recirculation system keeps the SDDM particulates uniformly distributed throughout the wellbore servicing fluid (e.g., a concentrated solution or slurry).

When it is desirable to prepare a wellbore servicing fluid comprising an SDDM of the type disclosed herein (i.e., a diverting fluid) for use in a wellbore, the diverting fluid prepared at the wellsite or previously transported to and, if necessary, stored at the on-site location may be combined with the SDDM, additional water and optional other additives to form the diverting fluid. In an embodiment, additional diverting materials may be added to the diverting fluid on-the-fly along with the other components/additives. The resulting diverting fluid may be pumped downhole where it may function as intended.

In an embodiment, a concentrated SDDM liquid additive is mixed with additional water to form a diluted liquid additive, which is subsequently added to a diverting fluid. The additional water may comprise fresh water, salt water such as an unsaturated aqueous salt solution or a saturated aqueous salt solution, or combinations thereof. In an embodiment, the liquid additive comprising the SDDM is injected into a delivery pump being used to supply the additional water to a diverting fluid composition. As such, the water used to carry the SDDM particulates and this additional water are both available to the diverting fluid such that the SDDM may be dispersed throughout the diverting fluid.

In an alternative embodiment, the SDDM prepared as a liquid additive is combined with a ready-to-use diverting fluid as the diverting fluid is being pumped into the wellbore. In such embodiments, the liquid additive may be injected into the suction of the pump. In such embodiments, the liquid additive can be added at a controlled rate to the diverting fluid (e.g., or a component thereof such as blending water) using a continuous metering system (CMS) unit. The CMS unit can also be employed to control the rate at which the liquid additive is introduced to the diverting fluid or component thereof as well as the rate at which any other optional additives are introduced to the diverting fluid or component thereof. As such, the CMS unit can be used to achieve an accurate and precise ratio of water to SDDM concentration in the diverting fluid such that the properties of the diverting fluid (e.g., density, viscosity), are suitable for the downhole conditions of the wellbore. The concentrations of the components in the diverting fluid, e.g., the SDDMs, can be adjusted to their desired amounts before delivering the composition into the wellbore. Those concentrations thus are not limited to the original design specification of the diverting fluid and can be varied to account for changes in the downhole conditions of the wellbore that may occur before the composition is actually pumped into the wellbore.

In an embodiment, the wellbore servicing fluid comprises a composite treatment fluid. As used herein, the term "composite treatment fluid" generally refers to a treatment fluid comprising at least two component fluids. In such an embodiment, the two or more component fluids may be delivered into the wellbore separately via different flowpaths (e.g., such as via a flowbore, a wellbore tubular and/or via an annular space between the wellbore tubular and a wellbore wall/casing) and substantially intermingled or mixed within the wellbore (e.g., in situ) so as to form the composite treatment fluid. Composite treatment fluids are described in more detail in U.S. Patent Publication No. 2010/0044041 A1 which is incorporated by reference herein in its entirety.

In an embodiment, the composite treatment fluid comprises a diverting fluid (e.g., a wellbore servicing fluid comprising an SDDM of the type disclosed herein). In such an embodiment, the diverting fluid may be formed from a first component and a second component. For example, the first component may comprise a diverter-laden slurry (e.g., a concentrated diverter-laden slurry pumped via a tubular flowbore) and the second component may comprise a fluid with which the diverter-laden slurry may be mixed to yield the composite diverting fluid, that is, a diluent (e.g., an aqueous fluid, such as water pumped via an annulus). In an embodiment, the diverter-laden slurry comprises an SDDM-laden slurry.

In an embodiment, the diverter-laden slurry (e.g., the first component) comprises a base fluid, and diverting materials (e.g., an SDDM of the type disclosed herein). In an embodiment, the base fluid may comprise a substantially aqueous fluid. As used herein, the term "substantially aqueous fluid" may refer to a fluid comprising less than about 25% by weight of a non-aqueous component, alternatively less than about 20% by weight, alternatively less than about 15% by weight, alternatively less than about 10% by weight, alternatively less than about 5% by weight, alternatively less than about 2.5% by weight, alternatively less than about 1.0% by weight of a non-aqueous component. Examples of suitable aqueous fluids include, but are not limited to, water that is potable or non-potable, untreated water, partially treated water, treated water, produced water, city water, well-water, surface water, or combinations thereof. In an alternative or additional embodiment, the base fluid may comprise an aqueous gel, a viscoelastic surfactant gel, an oil gel, a foamed gel, an emulsion, an inverse emulsion, or combinations thereof.

In an embodiment, the diluent (e.g., the second component) may comprise a suitable aqueous fluid, aqueous gel, viscoelastic surfactant gel, oil gel, a foamed gel, emulsion, inverse emulsion, or combinations thereof. For example, the diluent may comprise one or more of the compositions disclosed above with reference to the base fluid. In an embodiment, the diluent may have a composition substantially similar to that of the base fluid; alternatively, the diluent may have a composition different from that of the base fluid.

In an embodiment, the size and/or shape of the diverting material may be chosen so as to provide a plug (e.g., filter cake) within a given flowpath (e.g., within a point of entry into the wellbore and/or at a given distance from the wellbore within a fracture) having a given size, shape, and/or orientation. In an embodiment, the SDDM may be added to the wellbore servicing fluid to generate a diverting fluid which is then pumped downhole at the same time with additional diverting material.

In an embodiment, the SDDM once placed downhole enters the formation and forms a diverter plug resulting in an increased pressure in the near wellbore region ranging from about 50 psi to about 5000 psi.

In an embodiment, as noted above, the SDDM may be configured, for example, via selection of a given size and/or shape, for placement at a given position (e.g., at a given depth of the wellbore) within such a flowpath. Without wishing to be limited by theory, where it is desired that a diverter plug forms in the near-wellbore region, the SDDM may be selected so as to have a multimodal particle size distribution for example, the DM (e.g., BIOVERT NWB diverting agent) may have about 20-25% of the material at a particle size of about 4 to about 10 mesh; about 50% of the material may have a particle size in the range of about 20 to about 40 mesh size while the remaining material may have a particle size of less than about 40 mesh. As used herein, the term "mesh size" is used to refer to the sizing of a particular screen as defined by as "ASTM E-11 Specifications" or "ISO 3310-1". Generally, mesh size may refer approximately to the greatest size of material that will pass through a particular mesh size, for example, the nominal opening. The mesh size may also refer to the inside dimension of each opening in the mesh (e.g., the inside diameter of each square). Alternatively, where it is desired that a diverter plug forms in the far-wellbore region, the SDDM may be selected so as to have a smaller particle size (e.g., smaller than about 100 mesh). The near-wellbore region delimitation is dependent upon the formation where the wellbore is located, and is based on the wellbore surrounding conditions. The far-wellbore region is different from the near-wellbore region in that it is subjected to an entirely different set of conditions and/or stimuli. In an embodiment, the near-wellbore and far-wellbore regions are based on the fracture length propagating away from the wellbore. In such embodiments, the near-wellbore region refers to about the first 20% of the fracture length propagating away from the wellbore (e.g., 50 feet) whereas the far-wellbore region refers to a length that is greater than about 20% of the fracture length propagating away from the wellbore (e.g., greater than about 50 feet). Again, without wishing to be limited by theory, smaller diverter particles may be carried a greater distance into the formation (e.g., into an existing and/or extending fracture).

A method of servicing a wellbore may comprise placing a wellbore servicing fluid (e.g., fracturing or other stimulation fluid such as an acidizing fluid) into a portion of a wellbore. In such embodiments, the fracturing or stimulation fluid may enter flow paths and perform its intended function of increasing the production of a desired resource from that portion of the wellbore. The level of production from the portion of the wellbore that has been stimulated may taper off over time such that stimulation of a different portion of the well is desirable. Additionally or alternatively, previously formed flowpaths may need to be temporarily plugged in order to fracture or stimulate additional/alternative intervals or zones during a given wellbore service or treatment. In an embodiment, an amount of a diverting fluid (e.g., wellbore servicing fluid comprising an SDDM) sufficient to effect diversion of a wellbore servicing fluid from a first flowpath to a second flowpath is delivered to the wellbore. The diverting fluid may form a temporary plug, also known as a diverter plug or diverter cake, once disposed within the first flowpath which restricts entry of a wellbore servicing fluid (e.g., fracturing or stimulation fluid) into the first flowpath. The diverter plug deposits onto the face of the formation and creates a temporary skin or structural, physical and/or chemical obstruction that decreases the permeability of the zone. The wellbore servicing fluid restricted from entering the first flowpath may enter one or more additional flowpaths and perform its intended function. Within a first treatment stage, the process of introducing a wellbore servicing fluid into the formation to perform an intended function (e.g., fracturing or stimulation) and, thereafter, diverting the wellbore servicing fluid to another flowpath into the formation and/or to a different location or depth within a given flowpath may be continued until some user and/or process goal is obtained. In an additional embodiment, this diverting procedure may be repeated with respect to each of a second, third, fourth, fifth, sixth, or more, treatment stages, for example, as disclosed herein with respect to the first treatment stage.

In an embodiment, the wellbore service being performed is a fracturing operation, wherein a fracturing fluid is placed (e.g., pumped downhole) at a first location in the formation and an SDDM is employed to divert the fracturing fluid from the first location to a second location in the formation such that fracturing can be carried out at a plurality of locations. The SDDM may be placed into the first (or any subsequent location) via pumping a slug of a diverter fluid (e.g., a fluid having a different composition than the fracturing fluid) containing the SDDM and/or by adding the SDDM directly to the fracturing fluid, for example to create a slug of fracturing fluid comprising the SDDM. The SDDM may form a diverter plug at the first location (and any subsequent location so treated) such that the fracturing fluid may be selectively placed at one or more additional locations, for example during a multi-stage fracturing operation.

In an embodiment, following a wellbore servicing operation utilizing a diverting fluid (e.g., a wellbore servicing fluid comprising an SDDM), the wellbore and/or the subterranean formation may be prepared for production, for example, production of a hydrocarbon, therefrom.

In an embodiment, preparing the wellbore and/or formation for production may comprise removing an SDDM (which has formed a temporary plug) from one or more flowpaths, for example, by allowing the diverting materials therein to degrade and subsequently recovering hydrocarbons from the formation via the wellbore.

In an embodiment the SDDM comprises a degradable polymer of the type previously disclosed herein, which degrades due to, inter alia, a chemical and/or radical process such as hydrolysis or oxidation. As may be appreciated by one of skill in the art upon viewing this disclosure, the degradability of a polymer may depend at least in part on its backbone structure. For example, the presence of hydrolyzable and/or oxidizable linkages within the backbone structure may yield a material that will degrade as described herein. As may also be appreciated by one of skill in the art upon viewing this disclosure, the rates at which such polymers degrade may be at least partially dependent upon polymer characteristics such as the type of repetitive unit, composition, sequence, length, molecular geometry, molecular weight, morphology (e.g., crystallinity, size of spherulites, and orientation), hydrophilicity, hydrophobicity, surface area, and type of additives. Additionally, the ambient downhole environment to which a given polymer is subjected may also influence how it degrades, (e.g., temperature, presence of moisture, oxygen, microorganisms, enzymes, pH, pressure, the like, and combinations thereof).

In an embodiment, the SDDM is of the type depicted in FIG. 1B. In an embodiment, and SDDM particle 30 comprises a DM 15 and a DA 40. Upon placement in the wellbore and diverter plug formation, the DA 40 may accelerate degradation of the DM. For example, an encapsulated DA may have the structural integrity of the encapsulating material compromised (e.g., by in situ wellbore temperatures) such that the DA is contacted with the DM and begins to degrade the DM. Alternatively, the DA which is in contact with the DM when placed in the wellbore under ambient surface conditions may degrade the DM at some rate (x) which is accelerated to a rate (y) when subjected to in situ wellbore conditions (e.g., elevated temperatures and/or pressures). As will be appreciated by one of ordinary skill in the art, the DA (with or without encapsulation) which has been mixed with the DM is located at discrete locations within the DM such that SDDM can be envisioned as a composite material having a continuous phase of DM and a discontinuous phase of DA. DA disposed within the DM may degrade DM molecules resulting in the formation of voids within the SDDM. The resultant degraded SDDM particle 35 may be characterized by the appearance of voids/pores 60 (i.e., a porous structure). The degraded SDDM particle 35 has a greater surface area exposed to the wellbore servicing fluid due to the presence of the pores 60, when compared to the surface area of the original, undegraded SDDM particle 30. Degradation 70 of the diverter material 15 may be faster due to both the altered pH 55 and the increased surface area of the degraded SDDM particle 35, when compared to the degradation 20 of diverter particles 10 comprising the same DM 15, but lacking the pores as seen in FIG. 1A.

In an embodiment, the degraded SDDM particle 35 comprises a degradable polymer having an enhanced surface area. Without wishing to be limited by theory, the larger the surface area exposed to a medium and/or environment in which the material undergoes a reaction (e.g., hydrolytic degradation), the shorter the reaction time frame will be for a fixed amount of material, while keeping all the other conditions unchanged (e.g., same pressure, same temperature, etc.). For example, if polymeric material A (e.g., DM) is a nonporous solid having a mass x and a surface area y, then the porous diverter material of this disclosure obtained upon DA dissolution from polymer A that has the same mass x, may have a surface area of 2y, 5y, 10y, 20y, 50y, or 100y. As a result of having a larger surface area, the porous diverter material may display faster degradation times than the original nonporous solid polymeric material A. In an embodiment, the SDDM may result in a degraded SDDM particle 35 which displays a surface area that is increased with respect to the solid diverter material (i.e., pore-free solid) by a factor of about 50, alternatively by a factor of about 100, or alternatively by a factor of about 200. Thus a mechanism of increasing the degradability of a DM may include physical alteration of the DM (e.g., induce pores to increase the surface area) as well as chemical and/or structural alterations such as cleaving the backbone of the DM, increasing the number of radicals present that attack the DM's polymer chains, catalyzing the decomposition reaction, etc.

In an embodiment, the SDDM when subjected to degradation conditions of the type disclosed herein (e.g., elevated temperatures and/or pressures) degrades in a time range of about 4 h, alternatively about 6 h, or alternatively about 12 h. Alternatively, SDDMs of the type disclosed herein due to the presence of a DA substantially degrade in a time frame of less than about 1 week, alternatively less than about 2 days, or alternatively less than about 1 day.

In another embodiment, the SDDM comprises a material which is characterized by the ability to be degraded at bottom hole temperatures (BHT) of less than about 120° F., alternatively less than about 250° F., or alternatively less than about 350° F.

In an embodiment, SDDMs of the type disclosed herein provide an economic advantage over the use of DMs as the SDDMs utilize a reduced amount of DM in comparison to provide a similar diverting capability.

The following are additional enumerated embodiments of the concepts disclosed herein.

A first embodiment which is a method of servicing a wellbore in a subterranean formation comprising placing a first wellbore servicing fluid comprising a self-degrading diverter material into the wellbore wherein the self-degrading diverter materials comprises (i) a diverting material and (ii) a degradation accelerator allowing the self-degrading diverter material to form a diverter plug at a first location in the wellbore or subterranean formation; diverting the flow of a second wellbore servicing fluid to a second location in the wellbore or subterranean formation; and removing the diverter plug, wherein the first and second wellbore servicing fluids may be the same or different.

A second embodiment which is the method of the first embodiment wherein the diverting material comprises a degradable material.

A third embodiment which is the method of the second embodiment wherein the degradable material comprises a degradable polymer.

A fourth embodiment which is the method of the third embodiment wherein the degradable polymer comprises polysaccharides; lignosulfonates; chitins; chitosans; proteins; proteinous materials; fatty alcohols; fatty esters; fatty acid salts; aliphatic polyesters; poly(lactides); poly(glycolides); poly(ϵ-caprolactones); polyoxymethylene; polyurethanes; poly(hydroxybutyrates); poly(anhydrides); aliphatic polycarbonates; polyvinyl polymers; acrylic-based polymers; poly(amino acids); poly(aspartic acid); poly(alkylene oxides); poly(ethylene oxides); polyphosphazenes; poly (orthoesters); poly(hydroxy ester ethers); polyether esters; polyester amides; polyamides; polyhydroxyalkanoates; polyethyleneterephthalates; polybutyleneterephthalates; polyethylenenaphthalenates, or combinations thereof.

A fifth embodiment which is the method of the fourth embodiment wherein the aliphatic polyester comprises a compound represented by general formula I:

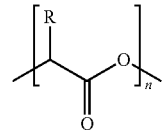

Formula I where n is an integer ranging from about 75 to about 10,000 and R comprises hydrogen, an alkyl group, an aryl group, alkylaryl groups, acetyl groups, heteroatoms, or combinations thereof.

A sixth embodiment which is the method of any of the second through third embodiments wherein the degradable polymer comprises polylactic acid.

A seventh embodiment which is the method of any of the first through sixth embodiments wherein the degradation accelerator comprises an inorganic base, an organic base, a base precursor, an acid, acid precursor, or combinations thereof.

An eighth embodiment which is the method of the seventh embodiment wherein the inorganic base comprises sodium hydroxide, potassium hydroxide, magnesium hydroxide, ammonium hydroxide, calcium carbonate, sodium carbonate, sodium bicarbonate, magnesium oxide, or combinations thereof.

A ninth embodiment which is the method of the seventh embodiment wherein the organic base comprises amines, ethylene diamine, alkanolamines, ethanolamine, thriethanolamine, secondary amines, tertiary amines, oligomers of aziridine, triethylene tetramine, tetraethylene pentamine, polyethyleneimine, or combinations thereof.

A tenth embodiment which is the method of the seventh embodiment wherein the acid comprises formic acid; acetic acid; lactic acid; glycolic acid; oxalic acid; propionic acid; butyric acid; monochloroacetic acid; dichloroacetic acid; trichloroacetic acid; hydrochloric acid; nitric acid; sulphuric acid; sulphonic acid; sulphinic acid; phosphoric acid; phosphorous acid; phosphonic acid; phosphinic acid; sulphamic acid; p-toluenesulfonic acid; or combinations thereof.

An eleventh embodiment which is the method of the seventh embodiment wherein the acid precursor comprises aliphatic polyesters; glucono-delta-lactone; glucoheptonic lactone; poly(ϵ-caprolactones); poly(hydroxybutyrates); poly(anhydrides); aliphatic polycarbonates; poly(amino acids); polyphosphazenes; poly(ortho esters); orthoesters; monoethylene monoformate, monoethylene diformate, ethylene glycol monoformate, ethylene glycol diformate, diethylene glycol monoformate, diethylene glycol diformate, triethylene glycol diformate, glyceryl monoformate, glyceryl diformate, glyceryl triformate; formate esters of pentaerythritol, tri-n-propyl orthoformate, tri-n-butyl orthoformate, methyl lactate, ethyl lactate, propyl lactate, butyl lactate, trilactin, polylactic acid, poly(lactides), methyl acetate, ethyl acetate, propyl acetate, butyl acetate, monoacetin, diacetin, triacetin, glyceryl diacetate, glyceryl triacetate, tripropionin (a triester of propionic acid and glycerol), methyl glycolate, ethyl glycolate, propyl glycolate, butyl glycolate, poly(glycolides), or combinations thereof.

A twelfth embodiment which is the method of any of the first through eleventh embodiments wherein the degradation accelerator is encapsulated.

A thirteenth embodiment which is the method of any of the first through twelfth embodiments wherein the self-degrading diverter material is present in the wellbore servicing fluid in an amount of from about 0.01 ppg to about 6 ppg.

A fourteenth embodiment which is the method of any of the first through thirteenth embodiments wherein the first wellbore servicing fluid comprises a diverting fluid and the second wellbore servicing fluid comprises a fracturing fluid.

A fifteenth embodiment which is the method of the fourteenth embodiment wherein a first portion of the fracturing fluid is placed into the formation at the first location before the diverter fluid is placed in the formation at the first location and a second portion of the fracturing fluid is diverted from the first location to the second location.

A sixteenth embodiment which is the method of any of the first through fourteenth embodiments wherein the self-degrading diverter materials has a particle size of from about 0.1 microns to about 3000 microns.

A seventeenth embodiment which is a wellbore servicing fluid comprising self-degrading diverter material wherein the self-degrading diverter material comprises polylactide, sodium carbonate and a carrier fluid.

An eighteenth embodiment which is the method of the seventeenth embodiment wherein the wellbore servicing fluid comprises a diverting fluid.

A nineteenth embodiment which is a method of servicing a wellbore in a subterranean formation comprising placing a wellbore servicing fluid into the subterranean formation at a first location; plugging the first location with a self-degrading diverter material comprising a diverting material and a degradation accelerator such that all or a portion of the wellbore servicing fluid is diverted to a second location in the subterranean formation; placing the wellbore servicing fluid into the subterranean formation at the second location; and allowing the self-degrading diverter material to degrade to provide a flowpath from the subterranean formation to the wellbore for recovery of resources from the subterranean formation.

A twentieth embodiment which is the method of the nineteenth embodiment wherein the wellbore servicing fluid is a fracturing fluid and the subterranean formation is fractured thereby at the first and second locations.

While embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_L$, and an upper limit, $R_U$, is disclosed, any number falling within the range is specifically disclosed. In particular, the following numbers within the range are specifically disclosed: $R=R_L+k*(R_U-R_L)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the embodiments of the present invention. The discussion of a reference in the Description of Related Art is not an admission that it is prior art to the present invention, especially any reference that may have a publication date after the priority date of this application. The disclosures of all patents, patent applications, and publications cited herein are hereby incorporated by reference, to the extent that they provide exemplary, procedural or other details supplementary to those set forth herein.

What is claimed is:

1. A method of servicing a wellbore in a subterranean formation comprising:
    placing a first wellbore servicing fluid comprising a self-degrading diverter material into the wellbore wherein the self-degrading diverter material is a composite comprising (i) a diverting material and (ii) a degradation accelerator;
    allowing the self-degrading diverter material to form a diverter plug at a first location in the wellbore or subterranean formation;
    diverting the flow of a second wellbore servicing fluid to a second location in the wellbore or subterranean formation; and removing the diverter plug, wherein the first and second wellbore servicing fluids may be the same or different.

2. The method of claim 1 wherein the diverting material comprises a degradable material.

3. The method of claim 2 wherein the degradable material comprises a degradable polymer.

4. The method of claim 3 wherein the degradable polymer comprises polysaccharides; lignosulfonates; chitins; chitosans; proteins; proteinous materials; fatty alcohols; fatty esters; fatty acid salts; aliphatic polyesters; poly(lactides); poly(glycolides); poly(ϵ-caprolactones); polyoxymethylene; polyurethanes; poly(hydroxybutyrates); poly(anhydrides); aliphatic polycarbonates; polyvinyl polymers; acrylic-based polymers; poly(amino acids); poly(aspartic acid); poly(alkylene oxides); poly(ethylene oxides); polyphosphazenes; poly(orthoesters); poly(hydroxy ester ethers); polyether esters; polyester amides; polyamides; polyhydroxyalkanoates; polyethyleneterephthalates; polybutyleneterephthalates; polyethylenenaphthalenates, or combinations thereof.

5. The method of claim 4 wherein the aliphatic polyester comprises a compound represented by general formula I:

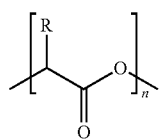

Formula I where n is an integer ranging from about 75 to about 10,000 and R comprises hydrogen, an alkyl group, an aryl group, alkylaryl groups, acetyl groups, heteroatoms, or combinations thereof.

6. The method of claim 3 wherein the degradable polymer comprises polylactic acid.

7. The method of claim 1 wherein the degradation accelerator comprises an inorganic base, an organic base, a base precursor, an acid, acid precursor, or combinations thereof.

8. The method of claim 7 wherein the inorganic base comprises sodium hydroxide, potassium hydroxide, magnesium hydroxide, ammonium hydroxide, calcium carbonate, sodium carbonate, sodium bicarbonate, magnesium oxide, or combinations thereof.

9. The method of claim 7 wherein the organic base comprises amines, ethylene diamine, alkanolamines, ethanolamine, thriethanolamine, secondary amines, tertiary amines, oligomers of aziridine, triethylene tetramine, tetraethylene pentamine, polyethyleneimine, or combinations thereof.

10. The method of claim 7 wherein the acid comprises formic acid; acetic acid; lactic acid; glycolic acid; oxalic acid; propionic acid; butyric acid; monochloroacetic acid; dichloroacetic acid; trichloroacetic acid; hydrochloric acid; nitric acid; sulphuric acid; sulphonic acid; sulphinic acid; phosphoric acid; phosphorous acid; phosphonic acid; phosphinic acid; sulphamic acid; p-toluenesulfonic acid; or combinations thereof.

11. The method of claim 7 wherein the acid precursor comprises aliphatic polyesters; glucono-delta-lactone; glucoheptonic lactone; poly(ϵ-caprolactones); poly(hydroxybutyrates); poly(anhydrides); aliphatic polycarbonates; poly(amino acids); polyphosphazenes; poly(ortho esters); orthoesters; monoethylene monoformate, monoethylene diformate, ethylene glycol monoformate, ethylene glycol diformate, diethylene glycol monoformate, diethylene glycol diformate, triethylene glycol diformate, glyceryl monoformate, glyceryl diformate, glyceryl triformate; formate esters of pentaerythritol, tri-n-propyl orthoformate, tri-n-butyl orthoformate, methyl lactate, ethyl lactate, propyl lactate, butyl lactate, trilactin, polylactic acid, poly(lactides), methyl acetate, ethyl acetate, propyl acetate, butyl acetate, monoacetin, diacetin, triacetin, glyceryl diacetate, glyceryl triacetate, tripropionin (a triester of propionic acid and glycerol), methyl glycolate, ethyl glycolate, propyl glycolate, butyl glycolate, poly(glycolides), or combinations thereof.

12. The method of claim 1 wherein the degradation accelerator is encapsulated.

13. The method of claim 1 wherein the self-degrading diverter material is present in the wellbore servicing fluid in an amount of from about 0.01 ppg to about 6 ppg.

14. The method of claim 1 wherein the first wellbore servicing fluid comprises a diverting fluid and the second wellbore servicing fluid comprises a fracturing fluid.

15. The method of claim 14 wherein the first portion of the fracturing fluid is placed into the formation at the first location before the diverter fluid is placed in the formation at the first location and a second portion of the fracturing fluid is diverted from the first location to the second location.

16. The method of claim 1 wherein the self-degrading diverter material has a particle size of from about 0.1 microns to about 3000 microns.

17. A method of servicing a wellbore in a subterranean formation comprising:
placing a wellbore servicing fluid into the subterranean formation at a first location;
plugging the first location with a self-degrading diverter material that is a composite comprising a diverting material and a degradation accelerator such that all or a portion of the wellbore servicing fluid is diverted to a second location in the subterranean formation;
placing the wellbore servicing fluid into the subterranean formation at the second location; and
allowing the self-degrading diverter material to degrade to provide a flowpath from the subterranean formation to the wellbore for recovery of resources from the subterranean formation.

18. The method of claim 1 wherein the self-degrading diverter material is mechanically sized.

19. The method of claim 1 wherein the self-degrading diverter material is a shaped particle.

20. The method of claim 1 wherein the self-degrading diverter material degrades in a time range of about 4 hours.

21. The method of claim 17 wherein the wellbore servicing fluid is a fracturing fluid and the subterranean formation is fractured thereby at the first and second locations.

* * * * *